United States Patent Office 3,400,548
Patented Sept. 10, 1968

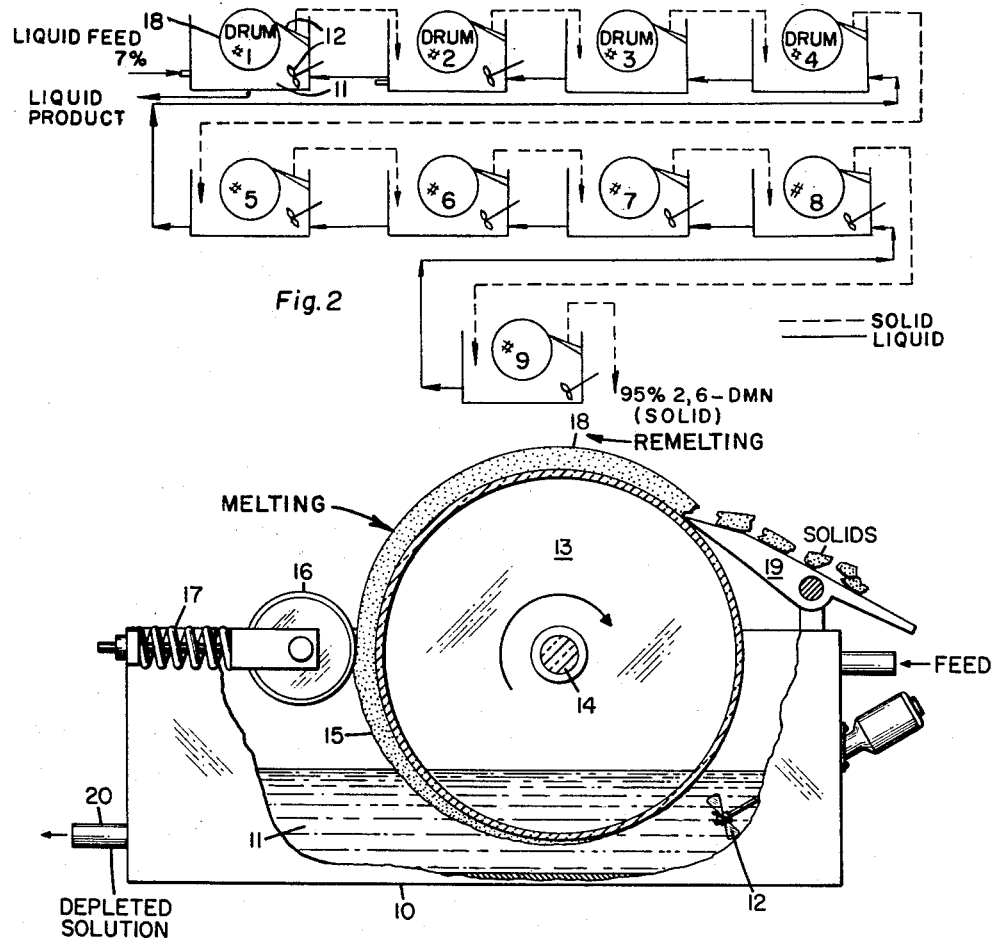

3,400,548
CRYSTAL SEPARATION OF DIMETHYL-
NAPHTHALENE
Dennis E. Drayer, Littleton, Colo., assignor to Marathon
Oil Company, Findlay, Ohio, a corporation of Ohio
Filed June 25, 1965, Ser. No. 467,063
5 Claims. (Cl. 62—58)

ABSTRACT OF THE DISCLOSURE

The invention comprises a process for the separation of 2,6-dimethylnaphthalene from solutions of liquid composition containing 2,6-dimethylnaphthalene and other dimethylnaphthalenes comprising in combination the steps of agitating a body of said liquid composition, contacting a portion of said liquid composition with the surface of an imperforate drum, said surface being cooled to a temperature below the crystallization point of said 2,6-dimethylnaphthalene and above about 18° F., whereby a portion of said liquid composition is cooled by contact with said drum, continuously moving the surface of said drum away from contact with said liquid composition at a rate sufficient to form a solid layer of crystals on said surface, said crystals being richer in 2,6-dimethylnaphthalene than is said solution, thereafter compressing said thin layer of crystals against said drum to reduce the solvent content of said thin layer, heating said layer to melt at least a portion of the crystals in a zone on the drum surface and thereafter recrystallizing at least a portion of said crystals by further cooling while on the surface of said drum, thereafter removing said thin layer from the surface of said drum, thereafter remelting at least a portion of the crystals from said thin layer and repeating the above steps utilizing a drum surface having a temperature at least about 18° higher than said first mentioned drum surface.

The present invention relates to a new processes for the recovery of crystallizable materials from solutions, and in particular, relates to new methods for the crystallization of compounds from solutions containing other crystallizable compounds.

A number of devices have been proposed by the prior art for the purpose of crystallizing out a less soluble component from a solution. Many of these have involved contacting the solution with a chilled surface, in some a rotating screw and in other cases a drum. Where rotating screws have been used, clean up of the apparatus has been difficult and carry-over the crystallized material back into the solution has been encountered. Where conventional rotating drums have been utilized, the amount of solution contained in the layer of deposited crystals has been sufficiently high that the separation process has necessarily been slow and required a large number of stages, particularly where the solution contains a number of crystallizable compounds having similar solubilities.

The present invention utilizes the rotating drum principle in order to obtain ease of clean up and the virtual elimination of carry-over of crystallized material back into the solution. The rotating drum is easily cleaned by a conventional doctor blade, air blast, or by a heat source located either internally or externally of the drum and heating the crystallized material at the point where removal is desired.

In addition, the present invention solves the problem of excessive solvent carry-over by providing means for compressing the layer of crystallized material in order to squeeze the excess solvent from the layer and obtain cleaner separation.

FIGURE 1 is a schematic diagram of a preferred embodiment of the process and apparatus of the present invention.

FIGURE 2 is the schematic diagram of the multiple drum system described in Example I.

In FIGURE 1, a typical feed solution consists of 7% 2,6-dimethylnaphthalene, 43% other dimethylnaphthalenes, 4% monomethylnaphthalenes, 5% ethylnaphthalenes, 2% trimethylnaphthalenes, and about 39% nonnaphthalenes. This is a reasonably typical stream obtained from the distillation of a solvent extract of a light catalytic cycle oil in a refinery.

The free solution is fed into a pan 10 where it is agitated by conventional rotary stirrers 12. The temperature of the solution 11 in the pan 10 is approximately 30° F. A chilled drum 13 having an average surface temperature of about −30° F. rotates about an axis 14 which is parallel to the bottom of pan 10. The drum is fabricated from copper but may be manufactured from any suitably non-corrodible material having reasonable thermal conductivity, e.g., other suitable metals, glass, and many plastics. The drum is fitted with inlets and outlets for cooling liquid, e.g., brine, which flows through the drum and maintains the above constant surface temperature. The level of coolant within the drum is preferably kept at approximately the same elevation as the upper surface of the solution 11 in pan 10.

The low portion of drum 13 contacts the solution 11 and crystallization of methylnaphthalenes occurs on the surface of the drum. This crystallization forms a layer 15 which is rich in the component having the highest crystallization point, that is, 2,6-dimethylnaphthalene. The layer at this point will contain approximately 60% by weight solvent as entrained liquid, about 30% by weight 2,6-dimethylnaphthalene (2,6-DMN) and lesser quantities of other crystallizable materials contained in the feed solution.

The layer 15 is compressed by roller 16 which is pressed against the layer by bias means 17. The bias means may be either spring loading, pneumatic cylinders, or other pressure producing means, but should be adjustable in order to permit the optimum separation of solvent from crystallized material in the drum.

The compressed layer 18 travels along on the surface of the drum. While not necessary to the practice of the present invention, various other purification steps may be performed at this point. For example, infrared bulbs or other heat sources may be placed above the drum to cause high radiant heat loads which melt the crystals in the layer deposited on the drum. The layer would then recrystallize after it had passed under the infrared bulbs, thus giving a "zone-melting effect" such as is used in the purification of semi-conductors and other crystallizable materials. Alternatively, additional quantities of solvent may be removed by the impingement of warm air on the layer at this point or by the drawing of a vacuum, for example, by a chamber fitted with a pair of rollers similar to roller 16 which contact the layer and form a seal permitting an area of reduced pressure to be maintained within the chamber.

The layer is removed from the drum by a conventional doctor blade 19. This blade may be replaced by heating devices which cause the crystals to separate from the drum or by an air blast or other means for removing the layer.

Depleted solution from which some of the more crystallizable component has been removed by crystallization on the drum 13 is removed from the pan 10 by an overflow 20.

Although the process of the present invention obtains relatively good separations in any given stage, it will in general be preferable to cascade a number of stages by redissolving the solids from any given stage and utilizing the resulting solution as feed solution for a later stage. Operating data on such a cascaded system recovering 2,6-DMN is given in Example I.

Also, it should be understood that while the drum 13 has been described as a cooled roller, the term "cooled" is used with reference to the temperature of the feed solution and the roller may in many cases be higher in temperature than the surrounding ambient air.

The temperature of the feed solution is not narrowly critical, but for best economy, it should be just above the crystallization point of the solution, that is, the temperature at which a precipitate is first formed. By just above the crystallization point is meant a temperature which permits reasonably economic recovery, preferably a temperature within 100° F. of the point at which the first solid precipitates, and most preferably at a temperature within 25° F. of that point.

The temperature of the drum surface will preferably be 5 to about 100° F. and most preferably from 10 to about 30° F. colder than the temperature at which the crystallizable compound to be removed precipitates from the feed solution. The optimum temperature will be a balance between the high throughput provided by low drum temperatures and the sharper separation of higher drum temperatures.

The force on the pressure ruller is best optimized by trial runs, but in most cases, a pressure of from 5 to about 100 p.s.i. of roller surface in contact with the layer of crystallized material will be preferred, with pressures of from 15 to about 50 p.s.i. being most preferred.

The above preferred embodiment and the specific example which follows have been illustrated with feed solutions from which 2,6-DMN is to be separated. While this is a particularly valuable application of the present invention, it will be understood that the invention is by no means restricted to such feed materials. Any solution containing crystallizable materials including a wide range of alkyl aromatics, e.g., xylenes, toluene, halobenzenes, halonaphthalenes, etc.; inorganic compounds such as: potassium nitrate, sodium hydroxide, sodium sulfate, potassium chloride, etc.; and even, with suitable solvents, certain crystallizable metals. The solvents suitable for use in the present invention include virtually all of the common solvents, e.g., organic solvents such as benzene, xylene, methylethylketone, dimethylformamide, n-methyl pyrrolidone, hexane, alcohols, etc., and the halogenated organics such as carbon tetrachloride, chloroform, methylene chloride, methylchloride (by the use of equipment sealed in a pressure chamber or a cold room), trifluorotrichloroethanes, etc., and even metals such as mercury or molten lead.

In other variations of the invention, the feed solution may be sprayed or permitted to flow onto the drum in relatively thin film with excess solution running off. Such variations are intended to be included when reference is made herein to a portion of the drum being in contact with the feed solution.

The following example will further illustrate the invention but should not be taken to limit it and the claims appended hereto are to be read so as to include all of the apparent modifications and variations of the invention.

EXAMPLE I

A feed solution consisting of approximately 7% by weight 2,6-DMN, 43% other DMN's, 4% monomethylnaphthalenes, 5% ethylnaphthalenes, 2% trimethylnaphthalenes, and 39% non-naphthalenes is fed at a rate of approximately 1,200 pounds per hour to a conventional filter. In order to remove relatively insoluble impurities, the solution is chilled to about −17° prior to filtration.

The filtrate from the filtration is fed at a rate of approximately 5,800 pounds per hour to a device similar to that described in FIGURE 1. A recycle stream of about 4,600 pounds per hour of depleted solution from a later stage is added to the filtrate. The pressure roller is operated under a pressure of approximately 25 p.s.i. of contact area and the partial crystallizer produces approximately 1,400 pounds per hour of 23% 2,6-DMN solid material.

This solid material is in turn combined with a recycle stream of depleted solution from a later stage to form a new feed solution which in turn is fed to a second apparatus identical with that shown in FIGURE 1. Here the effluent solid material contains 32% 2,6-DMN, and this is in turn combined with recycle and the process repeated through 9 stages.

The average drum temperatures and the percentage of 2,6-DMN coming off each of the drums are given in Table 1.

The finished material is 95% 2,6-DMN, although further processing would still further increase the purity of this material.

The present example demonstrates that the invention is capable of producing from a relatively lean (approximately 7% by weight) feed solution, a product of good commercial purity easily utilizable in any of a number of processes including oxidation to form 2,6-dicarboxynaphthalene for the production of polymeric materials.

TABLE 1

| Feed off drum | Wt. percent 2,7-DMN | Avg. drum surf. temp. (° F.) |
| --- | --- | --- |
|  | 7 |  |
| 1 | 23 | 18 |
| 2 | 32 | 46 |
| 3 | 41 | 72 |
| 4 | 50 | 95 |
| 5 | 59 | 117 |
| 6 | 68 | 136 |
| 7 | 77 | 158 |
| 8 | 86 | 180 |
| 9 | 95 | 198 |

What is claimed is:

1. A process for the separation of 2,6-dimethylnaphthalene from solutions of liquid composition containing 2,6-dimethylnaphthalene and other dimethylnaphthalenes comprising in combination the steps of agitating a first body of said liquid composition, contacting a portion of said liquid composition with the surface of an imperforate drum, said surface being cooled to a temperature below the crystallization point of said 2,6-dimethylnaphthalene and above about 18° F., whereby a portion of said liquid composition is cooled by contact with said drum, continuously moving the surface of said drum away from contact with said liquid composition at a rate sufficient to form a solid layer of crystals on said surface, said crystals being richer in 2,6-dimethylnaphthalene than is said solution, thereafter compressing said thin layer of crystals against said drum to reduce the solvent content of said thin layer, melting said thin layer to melt at least a portion of the crystals in a zone on the drum surface and thereafter recrystallizing at least a portion of said crystals by further cooling while on the surface of said drum thereafter removing said thin layer from the surface of said drum, thereafter remelting at least a portion of the crystals from said thin layer to form a second body of liquid richer in 2,6-dimethylnaphthalene than is said first body and repeating the above steps utilizing said second body of liquid a drum surface having a temperature at least about 18° higher than said first mentioned drum surface.

2. The process of claim 1 wherein fresh solution is continually fed past said cooled drum with solution depleted in the high crystallization point compound being continuously removed.

3. The process of claim 1 wherein a series of cooled drums is provided and wherein the depleted liquid from one drum thereafter moves into contact with a second drum and wherein the thin film from one drum is redissolved in a solvent and is thereafter fed past another drum for further purification.

4. The process of claim 3 wherein a series of drums is provided and wherein the thin film after removal from a first cooled drum is redissolved in a solvent to form a second solution which is further purified by contacting a second drum to form a layer of the higher crystallization point compound, said layer being compressed and thereafter removed from said drum.

5. The process of claim 1 wherein the solution is from 0 to about 100° F. above the crystallization point of the solution and the drum temperature is from about 10 to about 30° F. above said crystallization point.

References Cited

UNITED STATES PATENTS

| 402,968 | 5/1889 | Railsback | 62—346 |
| 2,221,993 | 11/1940 | Oswald | 62—58 |
| 2,904,412 | 9/1959 | McBride | 62—58 |
| 3,116,124 | 12/1963 | Eolkin | 159—10 |
| 3,264,753 | 9/1966 | Budzien | 159—10 |
| 290,016 | 12/1883 | Fairfield | 62—58 |
| 2,764,880 | 10/1956 | Wenzelberger | 62—58 |
| 2,651,922 | 9/1953 | Graham | 62—58 |

NORMAN YUDKOFF, *Primary Examiner.*

G. P. HINES, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,548                         September 10, 1968

Dennis E. Drayer

It is certified that error appears in the above identified patent and that said Letters Patent are hereby corrected as shown below:

Column 1, line 29, before "layer" insert -- thin --. Column 4, TABLE 1, in the heading to the table, second column thereof, "Wt. percent 2,7" should read -- Wt. percent 2,6 --.

Signed and sealed this 3rd day of February 1970.

(SEAL)
Attest:

Edward M. Fletcher, Jr.
Attesting Officer

WILLIAM E. SCHUYLER, JR.
Commissioner of Patents